United States Patent [19]

Blount

[11] 4,211,848

[45] Jul. 8, 1980

[54] PROCESS FOR THE PRODUCTION OF POLYISOCYANATE-POLYESTER-SILICATE PLASTIC

[76] Inventor: David H. Blount, 5450 Lea St., San Diego, Calif. 92105

[21] Appl. No.: 6,585

[22] Filed: Jan. 26, 1979

Related U.S. Application Data

[63] Continuation-in-part of Ser. No. 911,829, Jun. 2, 1978, which is a continuation-in-part of Ser. No. 663,924, Mar. 4, 1976, Pat. No. 4,097,424, which is a continuation-in-part of Ser. No. 599,000, Jul. 7, 1975, Pat. No. 4,072,637, which is a continuation-in-part of Ser. No. 262,485, Jun. 14, 1972, abandoned, which is a continuation-in-part of Ser. No. 71,629, Sep. 11, 1970, abandoned.

[51] Int. Cl.$^2$ .................................. C08J 9/00
[52] U.S. Cl. .................. 521/154; 260/18 S; 260/18 TN; 260/37 N; 521/99; 521/100; 521/116; 521/131; 521/133; 521/172; 528/26; 528/28; 528/39; 528/44; 528/46; 528/48; 528/50; 528/56; 528/55; 528/58; 528/80; 528/81; 528/83; 528/425; 525/28; 525/440; 525/455; 525/453
[58] Field of Search ............... 525/28, 440, 455; 260/18 TN, 18 S, 858, 859 R, 37 N; 521/100, 116, 131, 133, 99, 154, 172; 528/26, 28, 39, 44, 46, 48, 50, 55, 56, 58, 80, 81, 83, 84, 425

[56] References Cited

U.S. PATENT DOCUMENTS

| | | | |
|---|---|---|---|
| 4,097,423 | 6/1978 | Dieterick | 260/37 N |
| 4,125,498 | 11/1978 | Blount | 521/154 |
| 4,136,238 | 1/1979 | Hilterhaus et al. | 521/107 |

Primary Examiner—Melvyn I. Marquis

[57] ABSTRACT

A polyisocyanate is reacted with an unsaturated polyester containing a vinyl monomer and a water-binding agent, then cured with water containing an oxidated silicon compound and an initiator such as a peroxide to produce solid or cellular solid inorganic-organic plastic.

16 Claims, No Drawings

PROCESS FOR THE PRODUCTION OF POLYISOCYANATE-POLYESTER-SILICATE PLASTIC

CROSS-REFERENCE TO RELATED APPLICATIONS

This Application is a continuation-in-part of my copending U.S. Patent Application, Ser. No. 911,829, filed June 2, 1978, which is a continuation-in-part of my earlier U.S. Patent Application, Ser. No. 663,924, filed March 4, 1976, now Pat. No. 4,097,424 which is a continuation-in-part of my earlier U.S. Patent Application, Ser. No. 599,000, filed July 7, 1975, now U.S. Pat. No. 4,072,637, which is a continuation-in-part of my earlier U.S. Patent Application, Ser. No. 262,485, filed June 14, 1972, now abandoned, which is a continuation-in-part of my earlier U.S. Patent Application, Ser. No. 71,629, filed September 11, 1970, now abandoned.

BACKGROUND OF THE INVENTION

This invention relates to a process for the production of a polyisocyanate-polyester-silicate plastic which has high strength, elasticity, wear resistance, good thermostability and good fire-resistant characteristics. This inorganic-organic plastic may be produced as a solid or a cellular solid. The solid inorganic-organic plastic has the physical properties similar to polyester plastics such as high strength, wear resistance and water resistance, but is less expensive due to the high percentage of the water-binding agent that may be used. Its fire-resistant characteristics have been greatly improved. The cellular solid inorganic-organic plastic has high strength and rigidity, but has elasticity, good wear resistance, water resistance, good thermal- and sound-insulation properties similar to the polyurethane rigid foams, but is less expensive, due to the high percentage of the unsaturated polyester resin and water-binding agent used. It has much improved flame-resistant characteristics and water-resistant characteristics.

The polyisocyanate-polyester-silicate plastics which are produced by the process of this invention are characterized by high strength, elasticity, dimensional stability and flame resistance. They are produced by mixing:
(a) an organic polyisocyanate, preferably aromatic or polyisothiocyanate;
(b) an unsaturated polyester resin (a solution of an unsaturated linear polymer and a liquid monomer that is capable of copolymerizing with the linear polymer);
(c) an initiator, such as an organic peroxide;
(d) optionally a water-binding agent, preferably containing an oxidated silicon compound such as Portland cement;
(e) a curing agent, water which contains an oxidated silicon compound;
(f) optionally, other auxiliary agents and additives may be added.

The proportion, by weight, of component (a) to component (b) is preferably from 70:30 to 20:80. The quantity of component (c) needs to be only a catalytic amount which varies with each initiator. The quantity of component (d) may vary greatly from 0% up to 200%, by weight, based on components (a), (b) and (e). The quantity of component (e) may vary greatly from 10% to 100%, by weight, based on components (a) and (b).

In the process according to the invention, therefore, novel inorganic-organic plastics are produced when a curing agent such as water containing an oxidated silicon compound is combined with a mixture of:
(a) an organic polyisocyanate,
(b) an unsaturated polyester resin,
(c) an initiator,
(d) a water-binding agent (optional),
and, optionally, further auxiliaries and additives. The mixture thus obtained is allowed to react to completion.

Component (a)

Any suitable organic polyisocyanate or polyisothiocyanate may be used. It is generally preferred to use commercially readily available polyisocyanates, e.g., tolylene-2,4- and -2,6-diisocyanate and any mixtures of these isomers, ("TDI"), polyphenyl-polymethyleneisocyanates obtained by aniline-formaldehyde condensation followed by phosgenation ("crude MDI"), and polyisocyanates which contain carbodiimide groups, urethane groups, allophanate groups, isocyanurate groups, urea groups, imide groups or biuret groups, ("modified polyisocyanates").

Suitable organic polyisocyanates may be used according to the invention, including aliphatic, cycloaliphatic, araliphatic, aromatic and heterocyclic polyisocyanates such as those described, e.g., by W. Siefken in Justus Liebig's Annalen der Chemie, 562 pages 75 to 136, for example, ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3 and 1,4-diisocyanate and any mixture of these isomers; 1-isocyanate-3,3,5-trimethyl-5-isocyanatomethyl-cyclohexane (German Auslegeschrift No. 1,202,785); hexahydrotoylene-2,4- and -2,6-diisocyanate and any mixtures of these isomers; hexahydrodiphenylene-1,3- and/or -1,4-diisocyanate; perhydrodiphenylmethane-2,4'- and/or -4,4'-diisocyanate; phenylene-1,3-&-1,4-diisocyanate; tolylene-2,4- and -2,6-disocyanate and any mixtures of these isomers; diphenylmethane-2,4'-and/or -4,4'-diisocyanate; naphthylene-1,5-diisocyanate; triphenylmethane 4,4',-4''-triisocyanate; polyphenyl-polymethylene polyisocyanate of the kind which may be obtained by aniline-formaldehyde condensation followed by phosgenation which have been described, e.g., in British Pat. Nos. 874,430 and No. 848,671; perchlorinated arylpolyisocyanates such as those described, e.g., in German Auslegeschrift No. 1,157,601; polyisocyanates which contain carbodiimide groups as described in German Pat. No. 1,092,007; the diisocyanates described in U.S. Pat. No. 3,492,330; polyisocyanates which contain allophanate groups as described, e.g., in British Pat. No. 994,890, in Belgian Patent No. 761,626 and in published Dutch Pat. application No. 7,102,524; polyisocyanates which contain isocyanurate groups as described, e.g., in German Pat. Nos. 1,027,784 and 1,027,394, and in British Pat. Nos. 1,091,949, 1,267,011 and 1,305,036; polyisocyanates which contain urethane groups as described, e.g., in Belgian Pat. No. 752,261 or in U.S. Pat. No. 3,394,164; polyisocyanates which contain acylated urea groups according to U.S. Pat. No. 3,517,139; polyisocyanates which contain biuret groups as described, e.g., in German Pat. No. 1,101,394, in British Pat. No. 889,050 and in French Pat. No. 7,017,514; polyisocyanates prepared by telomerization reactions as described, e.g., in Belgian Pat. No. 723,640, polyisocyanates which contain ester groups such as those mentioned, e.g., in British Pat. Nos. 956,474 and 1,086,404 and in U.S. Pat. Nos. 3,281,378 and 3,567,763, and reaction products of the above-mentioned isocyanates with acetals according to German Pat. No. 1,072,385.

The distillation residues which are obtained from the commercial production of isocyanates and still contain isocyanate groups may also be used, optionally dissolved in one or more of the above-mentioned polyisocyanates. Mixtures of the above-mentioned polyisocyanates may also be used.

Organic polyisocyanates which are modified with ionic groups, for example, with carboxyl and/or carboxylate groups and/or sulphonic acid groups and/or sulphonate or sulphonate groups may be used with the above-mentioned organic polyisocyanates. A certain proportion of non-ionic hydrophilically-modified organic polyisocyanates may, of course, also be included.

Reaction products of from 50 to 99 mols of aromatic diisocyanates with from 1 to 50 mols of conventional organic compounds with a molecular weight of, generally, from about 400 to about 10,000 which contain at least two hydrogen atoms capable of reacting with isocyanates may also be used. While compounds which contain amino groups, thiol groups or carboxyl groups may be used, it is preferred to use organic polyhydroxyl compounds, in particular, compounds which contain 2 to 8 hydroxyl groups, e.g., polyesters, polyethers, polythioethers, polyacetals, polycarbonates or polyester amides containing at least 2, generally from 2 to 8, but preferably 2 to 4, hydroxyl groups of the kind known for producing homogeneous and cellular polyurethanes.

The hydroxyl group containing polyesters may be, for example, reaction products of polyhydric alcohols, preferably dihydric alcohols, with the optional addition of trihydric alcohols; and polybasic, preferably dibasic carboxylic acids. Istead of the free polycarboxylic acids, the corresponding polycarboxylic acid anhydrides or corresponding polycarboxylic acid esters of lower alcohols or their mixtures may be used for preparing the polyesters. The polycarboxylic acids may be aliphatic, cycloaliphatic, aromatic and/or heterocyclic and may be substituted, e.g., with halogen atoms and may be unsaturated. Examples include: succinic acid, adipic acid, suberic acid, azelic acid, phthalic acid, sebacic acid, isophthalic acid, trimetllitic acid, phthalic acid anhydride, tetrahydrophthalic acid anhydride, hexahydroththalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bisglycol terephthalate. Any suitable polyhydric alcohol may be used such as, for example, ethylene glycol; propylene-1,2- and -1,3-glycol; butylene-1,4- and -2,3-glycol; hexane-1,6-diol; octane 1,8-diol; neopentyl glycol; cyclohexanedimethanol-(1,4-bis-hydroxymethylcyclohexane); 2-methyl-propane-1,3-diol; glycerol; trimethylol propane; hexane-1,2,6-triol; butane-1,2,4-triol; trimethylol ethane; pentaerythritol; quinitol; mannitol and sorbitolmethylglycoside; diethylene glycol; triethylene glycol; tetraethyleneglycol; polyethylene glycols; dipropylene glycol; polypropylene glycols; dibutylene glycol and polybutylene glycols. The polyesters may also contain a proportion of carboxyl end groups. Polyesters of lactones, such as ε-caprolactone, or hydrocarboxylic acids, such as ω-hydroxy-caproic acid, may also be used.

the polyethers with at least 2, generally from 2 to 8, and preferably 2 to 3, hydroxyl groups, used according to the invention, are known and may be prepared, e.g., by the polymerization of epoxides, e.g., ethylene oxide, propylene oxide, butylene oxide, tetrahydrofuran, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol, propylene-1,3- or -1,2-glycol, trimethylol propane, 4,4'-dihydroxydiphenylpropane, aniline, ammonia, ethanolamine or ethylenediamine. Sucrose polyethers such as those described, e.g., in German Auslegeschriften Nos. 1,176,358 and 1,064,938, may be used according to the invention. It is frequently preferred to use polyethers which contain predominantly primary OH groups (up to 90% by weight, based on the total OH group content of the polyether). Polyethers modified with vinyl polymers such as those which may be obtained by polymerizing styrene or acrylonitrile in the presence of polyethers (U.S. Pat. Nos. 3,383,351; 3,523,093 and 3,110,695 and German Pat. No. 1,152,536), and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers, polythioether esters or polythioether ester amides, depending on the co-component.

The polycarbonates with hydroxyl groups used may be of the known kind, e.g., those which may be prepared by reacting diols, e.g., propane-1,3-diol; butane-1,4-diol and/or hexane-1,6-diol or diethyleneglycol, triethylene glycol or tetraethylene glycol, with diarylcarbonates, e.g., diphenylcarbonate or phosgene.

The polyacetals used may be, for example, the compounds which may be obtained from glycols, e.g., diethylene glycol, triethylene glycol, 4,4'-dihydroxydiphenyldimethylmethane, hexanediol, and formaldehyde. Polyacetals suitable for the invention may also be prepared by the polymerization of cyclic acetals.

The polyester amides and polyamides include, e.g., the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups, modified or unmodified natural polyols, e.g., castor oil, carbohydrates and starches, may also be used. Additional products of alkylene oxides with phenolformaldehyde resins or with urea-formaldehyde resins are also suitable for the purpose of the invention.

Examples of these compounds which are to be used according to the invention have been described, e.g., in High Polymers, Volume XVI, "Polyurethanes, Chemistry and Technology", published by Saunders-Frisch, Interscience Publishers, New York, London, Volume I, 1962, pages 32 to 42 and pages 44 to 54 and Volume II, 1964, pages 5 to 6 and 198 to 199; and in Kunststoff-Handbuch, Volume VII, Vieweg-Hochtlen, Carl-Hanser-Verlag, Munich, 1966, e.g., on pages 45 to 71.

If the polyisocyanate or the prepolymer which contains NCO groups has a viscosity above 2000 cP at 25° C., it may be advantageous to reduce the viscosity thereof by mixing it with a low-viscosity organic polyisocyanate and/or an inert blowing agent or solvent.

Component (b)

Any suitable unsaturated polyester resin may be used according to the invention. It is generally preferred to use commercially readily available unsaturated polyester polymers which usually contain a polymerable organic compound and a catalyst to catalyze the initiator (Component (e)).

The production of unsaturated polyester polymers and/or resins is well known in the arts, and a detailed description of their production will not be given in this Specification. Suitable unsaturated polyester polymers and/or resins are described, e.g., by Brage Golding, in Polymers and Resins, 1959, published by D. Van Nostrand Company, Inc., Princeton, New Jersey, Toronto, London and New York, pages 283 to 313.

The terms polyester, polyester resin or unsaturated polyester resin technically refer to a solution of an unsaturated linear polymer in a liquid monomer that is capable of copolymerizing with the linear polymer. Most polyester resins consist of a solution of an alkyl resin, prepared, for example, from propylene glycol, maleic acid, and adipic acid or from diethylene glycol, tetrahydrophthalic anhydride and fumaric acid, in 30% of its weight of styrene. An inhibitor, such as a quaternary ammonium salt, is added to prevent polymerization before use. Just prior to use, an initiator, such as a peroxide initiator, e.g., benzoyl peroxide or t-butylhydroperoxide together with a catalyst such as cobalt or manganese salt as a promoter, is added. Wide variations in the composition of the alkyd are possible and other liquid monomers, such as allyl phthalate or mixtures of styrene with vinyl acetate, methyl methacrylate, or vinyltoluene, may be used as the solvent. Reagents that add to the double bond of other $\alpha,\beta$-unsaturated acids also add to maleic and fumaric acids and their derivatives. $\alpha,\beta$-unsaturated acids are readily available. The most important $\alpha,\beta$-unsaturated compounds from a technical viewpoint are acrylonitrile, methyl acrylate and methyl methacrylate. The $\alpha,\beta$-unsaturated acids are usually made by the oxidation of an $\alpha,\beta$-unsaturated aldehyde. $\alpha,\beta$-unsaturated esters and nitriles react with these reagents with even greater ease than $\alpha,\beta$-unsaturated acids, especially when the reaction is catalyzed by bases. The $\beta$-aryl-substituted $\alpha,\beta$-unsaturated acids may be obtained by the Perkin Synthesis (an aldol-type addition of anhydrides to aromatic aldehydes). $\alpha,\beta$-unsaturated acids are described, e.g., in Textbook of Organic Chemistry by Carl R. Noller and published by W. G. Saunders Co., Philadelphia and London, 1966, pages 202, 463, 618 and 619. For the purpose of this invention, the technical definition of an unsaturated polyester resin will be used, that is, a solution of an unsaturated linear polymer in a liquid monomer that is capable of copolymerizing with the linear polymer. The unsaturated polyester resins are also known as contact and low-pressure laminating resins. The polyester resin is usually a linear, unsaturated polyester and the combintion of the unsaturated ester and the unsaturated vinyl-type monomer, i.e., the final product, is an unsaturated polyester resin.

Long-chain unsaturated polyester resins may be made from dibasic acids and dihydric alcohols. Either the dibasic acid or the dihydric alcohol may be unsaturated. Usually a combination of saturated and unsaturated dibasic acids and dihydric alcohols is used to produce the unsaturated polyester resin. Either or both of the dibasic acid and dihydric alcohol may be unsaturated. Instead of the dibasic acids, the corresponding polycarboxylic acid anhydrides or corresponding polycarboxylic acid esters of lower alcohols, or their mixtures, may be used for preparing the unsaturated polyester resins.

Suitabe dibasic acids may be aliphatic, cycloaliphatic, aromatic and/or heterocyclic and may be substituted, e.g., with halogen atoms. Examples of dibasic acids are listed with the polycarboxylic acid in Component (a). Any suitable unsaturated dibasic acid may be used such as maleic acid, maleic acid anhydride, fumaric acid, itaconic acid and mixtures thereof.

Polymerable oils may also be utilized in the production of unsaturated polyester resins. Polymerable oils include, but are not limited to, unsaturated fatty acids (or their esters), tung oil, linseed oil, heated linseed oil, soya bean oil, dehydrated castor oil and mixtures thereof. Other oils such as castor oil, tall oil, cottonseed oil, sunflower oil, fish oil, perilla oil, oiticica oil or safflower oil may be utilized with unsaturated polycarboxylic acid, carboxylic acid anhydrides and polyhydroxyl compounds.

Suitable dihydric alcohols are listed in Component (a) in the list of polyhydric alcohols. Saturated glycols such as ethylene glycol, propylene glycol and diethylene glycol are usually used with the unsaturated dibasic acids.

The unsaturated polyester resins may contain free hydroxyl groups and/or carboxyl groups may be used in this invention.

Suitable unsaturated alcohols such as allyl alcohol may be reacted with dibasic acids such as phthalic anhydride, succinic acid, maleic acid, maleic acid anhydride, itaconic acid and fumaric acid to produce allyl esters which may be polymerized alone or with other polymerizing monomers. Allyl esters such as diethylene glycol bis(allyl carbonate), diallyl maleate, diallyl fumarate, diallyl phthalate, diallyl benzene phosphonate, allyl itaconate, and methallyl methacrylate may be used in this invention. Triallyl cyanurate may be reacted with unsaturated polyester resins to produce resins and may be used as the polymerizing monomer.

Other unsaturated alcohols which may be reacted with dibasic acids include other polymeric allyl-type alcohols which are alcohols having a double bond of aliphatic character between two carbon atoms, one of which is attached directly to a saturated carbon atom, which, in turn, is attached directly to an alcoholic hydroxyl group, as represented by the general structural formula:

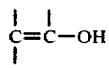

Alcohols embodying this structure may properly be termed "beta, gamma-olefinic monohydric alcohols". Allyl-type alcohols having a terminal methylene group attached by an olefinic double bond to a carbon atom, which is attached directly to a saturated carbinol carbon atom, are represented by the formula:

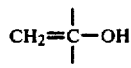

The alcohols falling within this class are otherwise identified as beta, gamma-monoolefinic monohydric alcohols having a terminal methylene group. Allyl-type alcohols include, but are not limited to, allyl alcohol, methallyl alcohol, ethallyl alcohol, chloroallyl alcohol, buten-1-ol-3; penten-1-ol-3; hexen-1-ol-3; 3-methyl-buten-1-ol-3; 3-methyl-penten-1-ol-3; 2-methyl-buten-1-ol-3; 2-methyl-penten-1-ol-3; 2,3-dimethyl-buten-1-ol-3; hepten-1-ol-3, etc.

Any suitable polymerizing monomer may be used with the unsaturated polyester resin such as, but not limited to, vinyl monomers, triallyl cyanurate, allyl esters and mixtures thereof.

Styrene is the preferred polymerizing monomer and may be used alone or in combination with vinyl toluene, acrylic and methacrylic esters, and vinyl acetate. Other vinyl monomers may be used such as acrylic acid compounds and esters, vinyl toluene, divinyl benzene, acrylonitrile, methacrylonitrile, etc.

Inhibitors, such as p-tert-butyl catechol, hydro-quinone, p-nitroso dimethylaniline, or similar compound, which will increase the lifetime of the unsaturated polyester resin, may be added to the unsaturated polyester resin.

Activators and promoters, used in conjunction with the initiators such as cobalt, in the form of its ethyl hexanoate or naphthenate salt, is a good, general-purpose activator for use with ketone peroxides, which may be added to the unsaturated polyester resin. Concentrations as low as 30 ppm of cobalt metal will activate a system. Other activators may be added to the unsaturated polyester resins such as tertiary dialkyl aryl amines, e.g., diethyl aniline, and aliphatic thiols, e.g., lauryl mercaptan when acyl peroxides are used.

Component (c)

Any suitable initiator which will promote the copolymerization of a solution of an unsaturated linear polymer in a liquid monomer may be used in this invention. The controlled polymerization of unsaturated polyester-monomer mixtures to yield fully cured solids usually requires the use of an initiator. The unsaturated polyester-monomer may be cured by the polyisocyanate and water when an excess of polyisocyanate is used, but it is preferable to use an initiator to cure unsaturated polyester resin.

Any suitable free-radical initiator, such as peroxides, azo compounds, alkali metal persulfates, ammonium persulfate and mixtures thereof, may be used. The fact that the action of organic peroxides can be modfied by activators and promoters, plus their ready availability at reasonable cost, makes them preferable in this invention. Thermal and photopolymerization may be used in certain cases.

Suitable organic peroxide initiators include, but are not limited to, acetyl benzoyl peroxide, peracetic acid, methyl ethyl ketone peroxide, cyclohexanone peroxide, cyclohexyl hydroperoxide, 2,4-dichlorobenzoyl peroxide, cumene hydroperoxide, tert-butyl hypoperoxide, methyl amyl ketone peroxide, lauroyl peroxide, benzoyl peroxide, tert-butyl perbenzoate, di-tert-butyl diperphthalate and mixtures thereof.

Promoters used with acyl peroxides include tertiary dialkyl aryl amines, such as diethyl aniline and aliphatic thiols, as, for example, lauryl mercaptan. Concentrations used are most often in the range of 0.05% to 0.5% of active substance. Promoters usually are strong reducing agents and initiators are strong oxidizing agents.

Suitable alkali metal persulfates include potassium and sodium persulfate. Redox systems may also be utilized in this invention.

Component (d)

Water-binding components may be used according to the invention which include organic or inorganic water-binding substances which have, first, the ability to chemically combine, preferably irreversibly, with water and, second, the ability to reinforce the polyisocyanate-polyester-silicate plastic end products of the invention. The most preferred water-binding component of the invention holds the water chemically bound until heated sufficiently, as in a fire. Thus, in a fire, the water is released and extinguishes the fire. The term "water-binding component" is used herein to identify a material, preferably granular or particulate, which is sufficiently anhydrous to be capable of absorbing water to form a solid or gel such as mortar or hydraulic cement. This component may be a mineral or chemical compound which is anhydrous, such as CaO and CaSO$_4$, but may exist as a partial hydrate. The water-binding components preferably used are inorganic materials such as hydraulic cements, synthetic anhydrite, gypsum or burnt lime. It is preferred that the water-binding component contain an oxidated silicon compound or that one should be added with the component.

Suitable hydraulic cements are, in particular, Portland cement, quick-setting cement, blast-furnace Portland cement, mild-burnt cement, sulphate-resistant cement, brick cement, lime cement, gypsum cement, pozzolan cement and calcium sulphate cement. In general, any mixture of fine ground lime, alumina and silica that will set a hard product by admixture of water, which combines chemically with the other ingredients to form a hydrate, may be used. The most preferred forms of water-binding agents to be used according to the invention are those materials which are normally known as cement. In other words, they are normally powdered materials with which water normally forms a paste which hardens slowly and may be used to bind intermixed crushed rock or gravel and sand into rock-hard concrete. There are so many different kinds of cement which can be used in the production of the compositions of the invention, and they are so well known, that a detailed description of cement will not be given here; however, one can find such a detailed description in Encyclopedia of Chemical Technology, Volume 4, Second Edition, Published by Kirk-Othmer, pages 684 to 710, as well as in other well known references in this field. In particular, pages 685 to 697 of the aforementioned Volume 4, Second Edition of Kirk-Othmer's Encyclopedia, containing a detailed disclosure of the type of cement which may be used in the production of the composition of this invention, are incorporated herein by reference.

Component (e)

Component (e) contains the curing agents and/or activators:

The following are examples of Component (e):
1. Water, when an oxidated silicon compound has been added to other components.
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates and may also be used. The molar ratio of $Ml_2OSiO_2$ (ml = metal) is not critical and may vary within the usual limits, but preferably between 4 to 1 and 0.2 to 1.
3. Water containing 10% to 50% by weight of ammonium silicate. 4. Water containing 10% to 70% by weight of silica sol.
5. Water containing 20% to 70% by weight of a water-binding agent being capable of absorbing water to form a solid or a gel, such as a hydraulic cement.
6. Any mixture of the above.

The curing agent may contain 0.001% to 10% by weight of an activator (catalyst) such as (a) tertiary amines, e.g., triethylamine, tributylamine, N-methyl-morpholine; N-ethyl-morpholine; N-cocomorpholine; N,N,N',N'-tetramethylethylenediamine; 1,4-diazo-biscyclo-(2,2,2)-octane; N-methyl-N'-dimethylaminoethyl piperazine; N,N-dimethylbenzylamine; bis(N,N-diethylaminoethyl)adipate; N,N-diethylbenzylamine; pentamethyldiethylenetriamine; N,N-dimethylcyclohexylamine; N,N,N',N'-tetramethyl-1,3-butanediamine; N,N-dimethyl-beta-phenylethylamine and 1,2-dimethylimidazole. Suitable tertiary amine activators which contain hydrogen atoms which are reactive with isocyanate groups include, e.g., triethanolamine; triisopanolamine; N,N-dimethylethanolamine; N-methyl-diethanolamine; N-ethyldiethanolamine, and their reactive products with alkylene, e.g., propylene oxide and/or ethylene oxide.

(b) Organo-metallic compounds, preferably organo-tin compounds such as tin salts of carboxylic acid, e.g., tin acetate, tin octoate, tin ethyl hexoate, and tin laurate; and the dialkyl salts of carboxylic acids, e.g., dibutyl tin diacetate, dibutyl tin dilaurate dibutyl tin maleate or dioctyl tin diacetate.

(c) Silaamines with carbon-silicon bonds as described, e.g., in British Pat. No. 1,090,589, may also be used as activators, e.g., 2,2,4-trimethyl-2-silamorpholine or 1,3-diethylaminomethyl-tetramethyl-di-siloxane.

(d) Other examples of catalysts (activators) which may be used according to the invention and details of their action are described in Kunststoff-Handbuch Volume VII, published by Vieweg and Hochtlen, Carl-Hanser-Verlag, Munich, 1966, e.g., on pages 96 and 102.

The activators may be added separately from the water to promote the reaction of the polyisocyanate with an active hydrogen.

Surface-active additives (emulsifiers and foam stabilizers) may also be used according to the invention. Suitable emulsifiers are, e.g., the sodium salts of ricinoleic sulphonates or of fatty acid diethylamine or stearic acid diethanolamine. Other surface-active additives are alkali metal or ammonium salts of sulphonic acids, e.g., dodecylbenzene sulphonic acid or dinaphthyl methane disulphonic acid, or fatty acids, e.g., ricinoleic acid, or polymeric fatty acids. The commercially available soaps and detergents may be used.

The foam stabilizers used are mainly water-soluble polyester siloxanes. These compounds generally have a polydimethylsiloxane group attached to a copolymer of ethylene oxide and propylene oxide. Foam stabilizers of this kind have been described, e.g., in U.S. Pat. No. 3,629,308. These additives are preferably used in quantities of from 0% to 20%, based on the reaction mixture.

Further examples of surface-active additives, foam stabilizers, cell regulators, negative catalysts, stabilizers, flame-retarding substances, plasticizers, dyes, fillers and fungicidal and bacteriocidal substances, and details about methods of using these additives and their actions, may be found in Kunststoff-Handbuch, Volume VI; published by Vieweg and Hochtlen, Carl-Hanser Verlag, Munich, 1966, e.g., on pages 103 to 113. The halogenated paraffins and inorganic salts of phosphoric acid are the preferred fire-retardant agents.

The surfactants may be used in this invention such as sodium dioctyl sulfosuccinate, potassium dioctyl sulfosuccinate and dioctyl calcium sulfosuccinate.

The oxidated silicon compounds which are used in this invention may be added to any of the active components of this invention. They may be pre-reacted with the polyisocyanate to produce polyisocyanate silicate prepolymers as in the process of U.S. Pat. Nos. 4,072,637 and 4,097,424; they may be added to unsaturated polyester; they may be added to the water-binding agent and/or be a part of the water-binding agent such as the oxidated silicon compound in hydraulic cement; they may be added to the curing agent in the form of a solution or in a suspension. The oxidated silicon compounds may be reacted with alcohols and polyols to produce organic hydroxyl silicate compounds, as produced by the process in U.S. Pat. No. 4,089,883. The oxidated silicon compound may be first reacted with a polyhydroxy alcohol and a polycarboxylic acid and/or organic acid anhydride as in U.S. Pat. No. 4,125,498.

Suitable oxidated silicon compounds which may be used include, but are not limited to, silica, e.g., hydrated silica, silicoformic acid and silica sol, alkali metal silicates, alkaline earth metal silicates, natural silicates containing free silicic acid groups and mixtures thereof.

The amount of oxidated silicon compound which may be used in the invention is quite varied because it will react with the available NCO groups, may be a part of the water-binding component, and any excess may be used as a filler. The oxidated silicon acid will also react with free hydroxyl and carboxyl groups in the polyester resin. The oxidated silicon compound content, as compared with the total organic content, may vary within wide limits, e.g., between 99:1 and 1:99, preferably between 70:30 and 20:80 parts by weight.

When there is a high alkali metal silicate content in the reaction mixture, acid-liberating hardeners may be added to the reaction mixture to react with the alkali metal group to form a salt. Halogen- or phosphorus-containing compounds are preferred. Any suitable salt-forming group may be used such as alkylating agents, and inorganic or organic acids are suitable. Sufficient amount is added to react with the alkali metal group to produce an alkali metal salt. The organic polyisocyanate may contain groups of the kind which form salt groups in the presence of alkali silicate, for example: —COOH, —$SO_2H$, —$SO_2$—NH—$SO_2$, —CO—NH—CO—, and also phenolic OH-groups. Two or more of the aforementioned groups can also be present.

Suitable hardeners include mineral acids, hydrogen-containing salts of mineral acids, organic acids, polyfunctional alkylating agents, monofunctional alkylating agents, e.g., methyl chloride, ethyl chloride, dimethyl sulfate, diethyl sulfate, etc. Further examples of acid-liberating hardeners may be found in DAS No. 1,205,087; Dutch Auslegeschrift No. 67/03743; German Pat. No. 1,178,586; and U.S. Pat. No. 3,450,592. Various salt-binding agents may also be used in combination.

SUMMARY OF THE INVENTION

The process for the production of polyisocyanate-polyester-silicate plastic products is simple. It is merely necessary for the components to come together. For example, an organic polyisocyanate, an unsaturated polyester, a catalytic amount of an initiator, optionally a water-binding agent containing an oxidated silicon compound, and a curing agent such as water are mixed simultaneously, after which the mixture generally hardens in a short period of time.

I have discovered that an oxidated silicon compound will react chemically with a polyisocyanate compound to produce a polyisocyanate silicate prepolymer, and the polyisocyanate reacts with the unsaturated polyester resin to produce a polyurethane silicate prepolymer. The prepolymer is cured by the use of an initiator to react the polymerizing monomer with the unsaturated polyester part of the prepolymer and a curing catalyst, such as water, to react with the free isocyanate groups and with the water-binding component.

The preferred method to produce polyisocyanate-polyester inorganic-organic plastic is to mix Component (b) (an unsaturated linear polymer in a liquid monomer that is capable of copolymerizing with the linear polymer), Component (a) (organic polyisocyanate) and Component (d) (a water-binding agent), then to add Component (c) (an initiator) while agitating. To this mixture, Component (e) (curing agent) is added while agitating and the mixture cures in a short period of time into a solid or cellular solid.

The components may be mixed in any suitable manner; they may be mixed simultaneously; Components (a) and (b) may be premixed, then Components (c), (d) and (e) added simultaneously; Components (b), (d) and (e) may be premixed, then Components (a) and (c) added; Component (d) may be added to Component (a), (b) and/or (e); the curing agent may contain surface-active additives from 0% up to 20% by weight, based on the mixture, to improve the emulsifying of water into the mixture and to aid in regulating and stabilizing the foam.

In an alternate method, Components (a), (b) and a portion of Component (d) are premixed to produce a polyurethane silicate prepolymer. The prepolymer may be stored; then when ready to use, Component (c) is added and thoroughly mixed with the prepolymer; then Component (e) is mixed with the rest of Component (d) and rapidly and thoroughly mixed with the prepolymer. The mixture cures in a short time to produce a solid or cellular solid product.

The reactions of this invention may take place under any suitable physical conditions. While many of the reactions will take place acceptably at ambient temperature and pressures, in some cases, better results may be obtained at somewhat elevated temperature and pressure. The reactions are somewhat exothermic and may elevate the temperature of the mixture. The reactants are preferably mixed at room temperature, though any suitable temperature in the range of 0° C. to 150° C. may be employed, preferably between 20° C. and about 100° C. In certain cases where the temperature of the mixture does not rise sufficiently to activate the initiator, it may be necessary to heat the mixture.

The ratios of the essential reactants which lead to the inorganic-organic plastic products of the invention may vary, broadly speaking, within ranges as follows:

a. from 20 to 70 parts by weight of the organic polyisocyanate;
b. from 30 to 80 parts by weight of the unsaturated polyester resin;
c. a catalytic amont of an initiator; the amount varies with each initiator;
d. from 0% up to 200% by weight, of a water-binding agent, based on the Components (a) and (b);
e. from 10% to 100% by weight of a curing agent, based on Components (a), (b) and (d);
f. from 0% up to 20% by weight of surface-active additives, based on weight of Components (a), (b), (c), (d) and (e);
g. from 0% up to 50% by weight of a blowing agent, based on Components (a), (b), (c), (d) and (e);
h. from 0% up to 150% by weight of an inert inorganic or organic particulate powder or fibrous filler material, based on the weight of the reactants;
i. from 5% up to 200% by weight of an oxidated silicon compound, based on Components (a), (b), (c), (d) and (e);
j. from 0% up to the equivalent mols of alkali metal atoms (in the mixture of reactants) of an acid-liberating hardener.

By the process of this invention, particularly high quality products are obtained. The hardening process proceeds more rapidly when the hardening process is carried out at temperatures above 40° C. In cases with combinations of organic polyisocyanates with 10% to 40% of NCO groups and alkali silicate and/or silica sol solution, so much heat is liberated, even in the absence of applied heat, that the water present begins to evaporate. Temperatures up to 110° C. may be reached inside the foam products. The products are usually as hard as stone, but, on the other hand, are highly elastic and, hence, highly resistant to impact and breakage. If the quantity of heat which is liberated during the reaction between the components is not sufficient to obtain optimum properties, mixing can readily be carried out at elevated temperatures, for example, temperatures of from 40° C. to 100° C. In special cases, mixing can also be carried out under pressure at temperatures above 100° C., up to about 150° C., in a closed container so the expansion occurs, accompanied by foam formation, as the material issues from the container. The reaction of polyisocyanates with oxidated silicon compound is endothermic, and if the reaction of the polyisocyanate with the curing agent does not produce enough heat, an external source of heat is required to heat the reaction mixture to above 30° C., preferably above 40° C., in order to decrease the curing time.

Generally, production of the foams in accordance with the invention is carried out by mixing the described reaction components together, either in one stage or in several stages in a batch-type or a continuous mixer, and allowing the resulting mixture to form and harden in molds or on suitable substrates, generally outside the mixer. The necessary reaction temperature, amounting to between 0° C. and 150° C. and preferably between 20° C. and 130° C., can either be achieved by preheating one or more reaction components before the mixing process or by heating the mixer itself or by heating the reaction mixture prepared after mixing. Combinations of these or other procedures for adjusting the reaction temperature are, of course, also suitable. In most cases, sufficient heat is generated during the reaction itself so that, after the beginning of the reaction or foaming, the reaction temperature can rise to levels above 100° C.

For any given recipe, the properties of the resulting foams, for example, their moist density, is goverened to some extent by the parameters of the mixing process, for example, the shape and rotational speed of the stirrer, the shape of the mixing chamber, etc., and also the reaction temperature selected for initiating foaming. The moist, fresh foam usually has a density of approximately 0.1 g/cc to 1.3 g/cc. The dried foams can have closed or open cells, but are open-celled in most cases. The compression strength obtained according to the invention depends to a large extent on the proportions in which the starting components are mixed and the resulting density, e.g., densities of between 200 and 600 kg/m$^2$, and compression strength of 10 to 100 kg. wt./cm$^2$ are obtained.

Generally, production of the solid products in accordance with the invention is carried out by mixing the described reaction components together, either in one stage or in several stages, in a batch-type or a continuous mixer, and allowing the resulting mixture to harden in molds or on suitable substrates, generally outside the mixer. The necessary reaction temperature amounts to between about 0° C. to 150° C., preferably between 20° C. and 150° C. The temperature necessary during the curing stage mainly depends on the temperature range in which the initiator functions properly. The desired temperature may be obtained by the use of an outside heat source; usually ambient temperature is satisfactory. The products produced are as hard as stone, but are elastic and highly resistant to impact and breakage.

The proportions of the components may be adjusted to obtain the desired product, from a solid to a highly cellular solid. When a higher percentage of the polyisocyanate is used, there are free NCO groups to react with the curing agent, water, to produce $CO_2$. Pores are produced in the product by the evolved $CO_2$. In certain cases, the $CO_2$ is rapidly evolved and escapes before the product hardens so that a solid product can be produced nearly completely free of air cells. The curing time generally increases with additives. When a high silicate content is desirable, such as when the final product is required to have mainly the properties of an inorganic silicate plastic or concrete such as, in particular, high-temperature resistance and complete flame resistance, an alkali metal silicate and/or silica, preferably hydrated silica, may be added to the curing agent or polyisocyanate. When a higher percentage of the unsaturated polyester resin is used with a low percentage of the polyisocyanate, the NCO groups react with the polyester, the oxidated silicon compound in the water-binding component and with the alkaline metal group in the water-binding component and/or the alkali metal group in the curing agent; therefore, there is no free $CO_2$ produced for foaming. In this mixture where no free $CO_2$ is produced and a cellular solid product is desired, a blowing agent may be added to the mixture.

In some preferred procedure, foaming is directly accompanied by hardening, for example, by preparing the reaction mixture in a mixing chamber and simultaneously adding the readily-volatile blowing agent such as, for example, dichlorodifluoromethane, trichlorofluoromethane, butane, isobutylene or vinyl chloride, so that, providing it has a suitable temperature, the reaction mixture issuing from the mixing chamber simultaneously foams through evaporation of the blowing agent and hardens to its final foam form under the effect of the organic polyisocyanate and initiator. Said foam optionally contains emulsifiers, foam stabilizers and other additives. In addition, the initially still-liquid reaction mixture can be expanded into a foam by the introduction of gases, optionally under pressure, such as air, methane, $CF_4$, noble gases. The resulting foam is introduced into the required mold and hardened therein. Similarly, the mixture of polyisocyanate, polyester and waterbinding agent, optionally containing foam stabilizers such as surfactants, foam formers, emulsifiers and, if desired, other organic or inorganic fillers or diluents, may initially be converted into a foam by blowing gas and the resulting gas may subsequently be mixed in the mixer with other components and, if desired, with the curing agent, the resulting mixture being allowed to harden. The curing agent may be preheated and added to the mixture of polyisocyanate, unsaturated polyester resin, water-binding agent, liquid expanding or blowing agent and thus hardened while foaming.

Instead of blowing agents, it is also possible to use inorganic or organic finely-divided hollow bodies such as expanded hollow beads of glass or plastics, expanded clay, straw and the like, for producing foams.

The foams obtainable in this way can be used in either their dry or their moist form, if desired, after a compacting or tempering process, optionally carried out under pressure. They will be useful as thermal- and sound-insulating materials for cavity filling, for packaging material and for building materials with outstanding resistance to solvents and favorable flame behavior. They can also be used as lightweight bricks or in the form of sandwich elements, for example, with metal-covering layers in house, vehicle and aircraft construction. They may be produced in the form of sheets which are used for siding on houses.

The reaction mixtures can also be dispersed in the form of droplets, for example, in petrol, or foamed and hardened during free fall or the like, resulting in the formation of foamed beads.

The polyisocyanate, unsaturated polyester, water-binding component, initiator and curing agent are simultaneously added; then, at a predetermined temperature, the blowing agent such as halogenated hydrocarbon, which is capable of evaporation or of gas formation at these temperatures, is added to the mixture. The initial liquid mixture formed can be used not only for producing uniform foams or nonuniform foams containing foamed or unfoamed fillers, but can also be used to foam through any given webs, woven fabrics, lattices, structural elements or other permeable structures of foamed materials, resulting in the formation of composite foams with special properties, for example, favorable flame behavior, which may optionally be directly used as structural elements in the building of furniture or vehicles and in the aircraft industries.

The so-called pot life during which the mixture remains in a workable state depends mainly on the chemical nature of, and proportions of, the components used. The pot life may vary from 0.2 seconds to about 15 hours. Mixing of components is generally carried out immediately before the molding or shaping process.

The so-called pot life also varies with the stage at which the initiator is added, the temperature, the concentration of the initiator, the type of initiator and whether or not a catalyst is used with the initiator. The water-binding component's curing is greatly affected by the temperature.

By virtue of the behavior of the reaction mixture, the process according to the invention is provided with a number of potential uses, either as porous or as homogeneous materials. Accordingly, a few fields of application are outlined by way of example in the following. The possibility of leaving the water present in the hardened mixtures as a required constituent of the foam, or of protecting the foam against the elimination of water by suitably coating or covering the foam with a water-impermeable layer, or of removing all or part of the water by suitable drying techniques (for example, in a heating cabinet or oven with hot air, infrared heating; ultra-sonic heating or high-frequency heating) can be selected from case to case in order to suit the particular requirement of application.

The foaming reaction mixture or the reaction mixture containing the blowing agent can be coated, for example, onto any given warm, cold or even IR- or HF-irradiated substrate, or, after passing through the mixer, can be sprayed with compressed air or applied by the airless process onto these substrates on which it can foam and harden to give a filling or insulating and protective coating. The foaming reaction mixture can also be molded, cast or injection-molded in cold or heated molds, being allowed to harden in these molds which may be relief or solid or hollow molds. Application can be made by centrifugal casting at room temperature or at temperatures of up to 200° C. and, if desired, under pressure. Strengthening elements may be used, whether in the form of inorganic and/or organic or metallic wires, fibers, webs, foams, woven fabrics, skeletons, etc. This can be done, for example, by the fiber-mat impregnating process or by processes in which reaction mixtures and strengthening fibers are applied together to the mold, for example, by means of a spray unit. The moldings obtainable in this way can be used as structural elements, for example, in the form of optionally foamed sandwich elements produced wither directly or subsequently by lamination with metal, glass, plastics, etc., in which case the favorable flame behavior of the foams in either their moist or dry form is of particular advantage. However, they can also be used as hollow bodies, being employed, for example, as containers for products that may have to be kept moist or cool, as filter materials, or exchangers, as supports fof catalysts or active substances, as decorative elements, as parts of furniture and as cavity fillings. They can also be used as high-stress lubricants and coolants or as carriers, therefore, for example, in the extrusion of metals. They can also be used in the field of pattern and mold design, and also in the production of molds for casting metals.

The foams obtainable by the process of this invention can be used in either their dry or their moist form, if desirable after a compacting or tempering process, optionally carried out under pressure; as insulating materials, cavity fillings, packaging materials, building materials with outstanding resistance to solvents and with favorable flame behavior. The reaction mixture may be sprayed onto impassable or loose terrain such as, for example, sand dunes or marshes, to obtain effective consolidation which soon becomes passable and offers protection against erosion. It is also advantageous to spray the proposed reaction mixtures onto articles which are to be protected in the event of fire or accident. The mixtures can form effective protective walls and protective layers in mines when sprayed onto woven fabrics or other surfaces, lattices or even only onto walls. The mixtures can be used in construction engineering, civil engineering and road building, for erecting walls and igloos, making seals, filling joints, plastering, flooring, insulating, decoration, boat or ship construction, and as a coating for metals, wood, concrete plastics, etc., screed and covering material. They can also be used as adhesives or mortars, and as casting compositions which are optionally filled with inorganic or organic fillers. They can be useful as auxiliaries which may, if desired, be used in, or subsequently introduced into, the reaction mixture, such as emulsifiers, surfactants, dispersants, hydrophobizing substances, odorants, etc.

When a technique of foaming in a mold under pressure is employed, molded parts with dense marginal zones and completely non-porous smooth surfaces can be obtained.

The process according to the invention is particularly suitable for in situ foaming on the building site. Thus, any types of hollow molds, of the kind made by formwork in the usual way, can be cast or can be filled with foam. The reaction mixture can also be used to fill cavities, gaps or cracks, giving a firm bond between the joined materials. Insulating internal plasters can also be readily produced by spraying on the reaction mixture. In many cases, the materials obtained can be used instead of wood or hard-fiber boards. They can be sawed, rubbed down, planed, nailed, drilled or milled. In this way, they can be worked and used in a number of different ways. The foams can be subsequently lacquered, metallized, coated, laminated, galvanized, subjected to vapor deposition, bonded or flocked in either their moist or dry form or in impregnated form.

The optionally filled moldings can be further modified in their properties by thermal aftertreatment, oxidation processes, hot-pressing, sintering processes, surface melting or other consolidation processes.

Suitable mold materials include inorganic and/or organic foamed or unfoamed materials such as metals, for example, iron, nickel, fine steel, lacquered or, for example, teflon-coated aluminum, porcelain, glass, wood, plastics such as PVC, polyethylene, epoxide resins, ABS, polycarbonates, etc.

The foams or solid products obtainable in accordance with the invention can be surface-treated or, where they are in the form of substantially permeable structures, such as substantially opencell foams or porous materials, can even be treated by centrifuging, vacuum treatment, blowing air through or by rinsing with (optionally heated) liquids or gases which remove the water present, such as methanol, ethanol, acetone dioxan, benzene, chloroform and the like. The foams or solid products can be dried with air, $CO_2$ or super-heated steam. Similarly, the moist or dry products can also be aftertreated by rinsing or by impregnating with aqueous or nonaqueous acid, neutral or basic liquids or gases such as hydrochloric acid, phosphoric acid, formic acid, acetic acid, ammonia, amines, organic or inorganic salt solutions, lacquer solutions, solutions of polymerizable or already polymerized monomers, dye solutions, galvanizing baths, solutions of catalysts or catalyst preliminary stages, odorants and the like.

The new composite materals are particularly suitable for use as structural materials because they show tensile and compressive strength, are tough, rigid and, at the same time, elastic. They show high permanent dimensional stability when hot and are substantially non-inflammable.

The unfoamed reaction mixture may be utilized in production of many products similar to those produced by the polyester resins, such as boats, construction panels, automobile parts and bodies, airplane structural parts, furniture, solid art objects, cavity-filling, plastering material, road building material, coating material for metals, wood, plastics, concrete, etc., adhesive material, mortar, walls, sealant, flooring, etc. The unfoamed reaction mixture may be sprayed on or be applied by a tool such as a trowel or brush to layers of fiberglass cloth or multiple layers of wire mesh such as chicken wire in order to produce items such as boats of which the hulls have good tensile and compressive strength, are rigid and, at the same time, elastic, show high permanent dimensional stability and good salt water resistance. A boat hull made of the materials of this invention, which have equal thickness and reinforcing materials, is very similar in strength and durability to a hull made of polyester boat resin. This material will produce a boat of much less weight compared to a ferro-cement boat, while using equivalent reinforcing material. A strong, lightweight wall which may be used in construction can be produced by pouring or spraying the unfoamed reaction mixture in a mold to make the outer surface, then pouring or spraying a foamable or foaming-reaction mixture for the core. When foaming is complete, an outer layer of the unfoamed reaction mixture is poured or sprayed on the foam and is finished in the desired texture or design. The thickness of the various layers may be varied to produce the desired strength.

Fillers in the form of particulate or powdered materials can be additionally incorporated into the mixtures of organic polyisocyanates, unsaturated polyester resin and water-binding agent and/or curing agent.

Suitable fillers include solid inorganic or organic substances, for example, in the form of powders, granulates, wire, fibers, dumb bells, crystallites, spirals, rods, beads, hollow beads, foam particles, webs, pieces of woven fabric, knit fabric, ribbons, pieces of film, etc, for example, of dolomite, chalk, alumina, asbestos, basic silicas, sand, gravel, talcum, iron oxide, aluminum oxide and oxide hydrate, zeolites, calcium silicates, basalt wool or powder, glass fibers, C-fibers, graphite, carbon black, Al-, Fe-, Cu-, Ag-powder, molybdenum sulphite, steel wool, bronze or copper cloth, silicon powder, expanded clay particles, hollow glass beads, glass powder, lava and pumice particles, wood chips, sawdust, cork, cotton, straw jute, sisal, hemp, flax, rayon, popcorn, coke, particles of filled or unfilled, foamed or unfoamed, stretched or unstretched organic polymers including plastics and rubber waste. Of the number of suitable organic polymers, the following, which can be present, for example, in the form of powders, granulates, foam particles, hollow beads, foamable or unfoamed particles, fibers, ribbons, woven fabric, webs, etc., are mentioned purely by way of example: polystyrene, polyethylene, polypropylene, polyacrylonitrile, polybutadiene, polyisoprene, polytetrafluorethylene, aliphatic and aromatic polyesters, melamine-urea or phenol resins, polyacetal resins, polyepoxides, polyhydantoins, polyureas, polyesters, polyurethane, polyimides, polyamides, polyethers, polysulphones, polycarbonates, and, of course, any copolymers as well. Inorganic fillers are preferred.

Generally, the composite materials according to the invention can be filled with considerable quantities of fillers without losing their valuable property spectrum. The amount of fillers can exceed the amount of the Components (a), (b), (c) and (d). In cases where higher amounts of fillers are used, it may be advisabe to add water in order to obtain sufficient working properties; coarse fillers can be used in wet form; powdered fillers such as, e.g., chalk, alumina, dolomite, calcium hydroxide, magnesium carbonate, sand and calcium carbonate, can be used also as an aqueous suspension.

Expanded clay may be used as a water-binding agent in this invention and will produce a polyisocyanate-polyester, silicate plastic which is strong, light weight, high concrete and may be used, for example, as panels in the construction field.

The object of the present invention is to provide a novel process to produce polyisocyanate-polyester-silicate plastics. Another object is to produce novel polyisocyanate-polyester-silicate plastic products. Still another object is to produce novel, fine cellular, solid products of relatively low cost, light weight, high strength, with good flame resistance and dimensional stability when heated. Another object is to produce novel solid polyisocyanate-polyester-silicate plastics. Another object is to produce solid or cellular solid products that may be used for sound and thermal insulating, structural purposes, shock-resistant packaging, coating for wood, metals and plastics, adhesives, casting materials, putty, etc.

DESCRIPTION OF PREFERRED EMBODIMENTS

My invention will be illustrated in greater detail by the specific Examples which follow, it being understood that these preferred embodiments are illustrative of, but not limited to, procedures which may be used in the production of polyisocyanate-polyester-silicate plastics. Parts and percentages are by weight unless otherwise indicated.

Example 1

Component (a): tolylene-2,4-diisocyanate;

Component (b): unsaturated polyester resin containing 2 mols of phthalic anhydride, 1 mol of maleic anhydride and 3.5 mols of propylene glycol, and 30% styrene with 0.005 to 0.01 part by weight of cobalt napthenate;

Component (c): 0.01 parts by weight of methyl ethyl ketone peroxide;

Component (e): water containing 40% silica sol and 2% sodium salt of ricinoleic sulphonate;

About 1 part by weight of Component (a), 2 parts by weight of Component (b) and 0.01 part by weight of Component (c) are thoroughly mixed, then 0.5 part by weight of Component (e) is rapidly and thoroughly mixed and in about 1 to 5 minutes, the mixture expands 3 to 10 times its original volume to produce a tough, rigid cellular plastic.

Example 2

Component (a): diisocyanatodiphenylmethane;

Component (b): unsaturated polyester resin containing about 2 mols of adipic acid, 1 mol of fumaric acid, 0.5 mol of ethylene glycol and 1.5 mols of propylene glycol, 20% styrene, 10% methyl methacrylate and 50 to 100 ppm of cobalt metal in the form of cobalt naphthenate;

Component (c): methyl ethyl ketone peroxide;
Component (d): Portland cement;
Component (e): water containing 0.01% triethylamine, 3% sodium salt of a sulphochlorinated $C_{10}$–$C_{14}$ paraffin mixture;

About 1 part by weight of Component (a), 3 parts by weight of Component (b) 0.005 to 0.02 part by weight of Component (d) and 1 part by weight of Component (d) are mixed; then 0.5 part by weight of Component (e) is thoroughly mixed, and in about 1 to 3 minutes, the mixture expands 3 to 10 times its original volume to produce a tough, rigid, cellular solid plastic.

Example 3

Component (a): tolylene diisocyanate (80% 2,4-isomer and 20% 2,6-isomer);
Component (b): unsaturated polyester resin containing diallyl phthalate, 20% styrene, 10% vinyl acetate and 100 ppm of cobalt metal in the form of cobalt naphthenate;
Component (c); methyl ethyl ketone peroxide;
Component (d) gypsum mixed with 50% hydrated silica;
Component (e): water containing 2% soap, 0.1% diethylenetriamine, 20% sodium silicate;
Additives: tris-(chloro-ethyl phosphate);
Blowing agent: trichlorofluoromethane;

About 1 part by weight of Component (a), 3 parts by weight of Component (b), catalytic amount of Component (c) and 3 parts by weight of Component (d) are thoroughly mixed; then the 0.1 part by weight of the additive, 0.25 part by weight of the blowing agent and 2 parts by weight of Component (e) are added simultaneously and are rapidly agitated. The mixture foams in 0.5 to 5 minutes and rapidly solidifies, thereby producing a rigid, rough, fine cellular solid plastic.

Example 4

Component (a): 20% solution of TDI residue in MDI (NCO content b 30% viscosity 1900 centipoises);
Component (b): unsaturated polyester resin produced by reacting 2 mols of sebacic acid, 1 mol of fumaric acid and 3.5 mols of diethylene glycol, and containing 15% styrene, 5% vinyl acetate, 5% methacrylic acid and 0.01% cobalt naphtenate;
Component (c): methyl amyl ketone peroxide;
Component (d): calcium oxide containing 25% Portland cement;
Component (e): water containing 10% sodium silicate, 5% magnesium oxide, 0.1% triethylamine;
Blowing agent: methylene chloride;
Additive: perchlorinated paraffin;

The following components are added, one after the other, into a high-speed mixer while agitating: 2 parts by weight of Component (a), 1 part by weight of Component (b), 0.01 part by weight of Component (c), 3 parts by weight of Component (d), 0.1 part by weight of perchlorinated paraffin and 0.5 part by weight of the blowing agent; then 1.5 parts by weight of Component (e) are added while continuing to stir for about 15 seconds. The mixture is then poured into a mold, and expands 3 to 10 times its original volume to produce a tough, rigid, cellular plastic with excellent resistance to fire and excellent insulating properties.

Example 5

Mixture I:
Component (a): 2 parts by weight of diisocyanatodiphenylmethane, distilled from crude phosgenation product of an aniline-formaldehyde condensate until the distillation residue has a viscosity of about 600 cP at 25° C. with an NCO content of 29 to 39% by weight.
Component (b): 4 parts by weight of an unsaturated polyester produced by reacting 2 mols of adipic acid, 0.5 mol of phthalic anhydride, 1 mol of fumaric acid and 4 mols of propylene glycol and containing 10% triallyl cyanurate, 10% divinyl benzene, 10% styrene and about 100 ppm of cobalt in the form of cobalt hexanoate.
Component (c): 0.02 parts by weight of methyl ethyl ketone peroxide.
Component (d): 2 parts by weight of rapid-setting cement.
Blowing agent: 0.6 part by weight of chloroform.
Mixture II:
Component (e): 2 parts by weight of water containing 2 parts by weight of rapid-setting cement, 0.05 part by weight of N-methylmorpholine, 0.02 part by weight of diazabicyclooctane polyether polysiloxane, 1 part by weight of silica sol and 0.1 part by weight of sodium salt of ricinoleic sulphonate.

Mixtures I and II are first thoroughly mixed separately, then rapidly and thoroughly mixed together for 10 to 20 seconds. Foaming begins in a few seconds, and in 1 to 5 minutes, the mixture becomes a rock hard, cellular solid product.

Example 6

Component (a): 1 part by weight of tolylene diisocyanate, 0.5 part by weight of sulphonated diisocyanatodiphenylmethane;
Component (b): 4 parts by weight of a commerical unsaturated polyester boat resin containing styrene and cobalt catalyst;
Component (e): 1 part by weight of water containing 30% sodium silicate and 15% silica sol;
Component (c): catalytic amount of methyl ethyl ketone peroxide;
Additives: 0.05 part by weight of sodium dioctyl sulfosuccinate, 0.01 part by weight of triethylamine and b 0.1 part by weight of glassfibers 3 to 5 mm. in length);

The components and additives are mixed simultaneously for 0.5 to 3 minutes, and a solf, workable mass is obtained. The mass is pressed into a mold at a temperature of 40° C. to 60° C., hardens into a hard, tough product within 30 minutes.

Example 7

Component (a): 1 part by weight of 4-methyl-m-phenylene diisocyanate;
Component (b): 4 parts by weight of a commerical unsaturated polyester laminating resin containing a catalyst;
Component (c) 0.05 part by weight of methyl ethyl ketone peroxide;
Component (d): 6 parts by weight of Portland cement;
Component (e): 3 parts by weight of water containing 30% silica and 1% of sodium dodecylbenzene sulphonate;

The components (a), (b), (c) and (d) are mixed, then Component (e) is added and thoroughly mixed to form a very thick liquid or soft, workable mass. The mixture is then spread with a brush or trowel between layers of fiberglass cloth and hardens in 15 minutes to 1 hour at ambient temperature, becoming very strong and rock hard in 1 to 12 hours, depending on the temperature and the amount of initiator used. When compared with comparable thickness of the polyester resin and fiberglass cloth, this composition appears to be just as strong.

Example 8

Component (a): 1 part by weight of methylenedi-p-phenylene diisocyanate;

Component (b): 3 parts by weight of a commercial unsaturated polyester casting resin ("Titan Casting Resin");

Component (c): 0.01 part by weight of an initiator (Titan Catalyst "P"); (Calif. Titan Products, Inc.)

Component (d): 4 parts by weight of gypsum;

Component (e): 2 parts by weight of water containing 40% sodium silicate;

Components (a), (b) and (d) are thoroughly mixed, then when desired, Components (c) and (e) are admixed simultaneously, the mixture forming a thick liquid, then a workable mass. In a few minutes, the mass hardens to a tough, rock hard, solid plastic. It is very useful for filling holes, cracks and cavities, for mortar, as an adhesive, as a plaster, etc.

Example 9

Component (a): 1 part by weight of a 30% solution of TDI residue in MDI (NCO content of about 30%, viscosity 1800 cP);

Component (b): 4 parts by weight of a commercial unsaturated polyester boat resin containing a catalyst; (Al Paint and Varnish Co., Torrance, Calif.)

Component (c): catalytic amount of methyl ethyl ketone;

Component (d): 5 parts by weight of sulphate resistant cement; 3 parts by weight of sharp sand;

Component (e): 2 parts by weight of water containing 1% triethylamine, 2% detergent and 0.1% tin acetate;

The components are added at ambient temperature to a mixer and thoroughly mixed for 1 to 3 minutes, then applied to layers of wire mesh to about a ¼" thickness; the mixture solidifies in 15 to 60 minutes and becomes strong and rock hard within 12 hours.

Example 10

Component (a): 1 part by weight of tolylene diisocyanate;

Component (b): 3 parts by weight of the unsaturated polyester as in Example 4;

Component (c): 0.05 part by weight of potassium persulfate;

Component (e): 1 part by weight of water containing 45% sodium silicate (molecular weight ratio Na$_2$O:-Na$_2$O=1:2), 0.1% triethylamine and 1% stearic acid diethylamine;

Additive: 0.25 part by weight of calcium hydrogen phosphate;

Blowing agent: 0.2 part by weight of trichlorofluorourethane;

Components (a), (b), (c) and the blowing agent are thoroughly mixed, then Component (e) and the additive are added simultaneously and stirred for about 15 to 20 seconds, then poured into a mold. The foaming begins in a few seconds and expands 3 to 10 times its original volume and hardens in 1 to 10 minutes. After 3 to 12 hours, the foam is a rock hard, tough, cellular solid.

Example 11

Component (a): 2 parts by weight of tolylene diisocyanate;

Component (b): 3 parts by weight of an unsaturated polyester resin containing diallyl phthalate and equal parts by weight of diethylene glycol bis(allyl carbonate); 20% acrylonitrile and 10% methyl methacrylate;

Component (c): 0.05 parts by weight of potassium persulfate;

Component (d): 4 parts by weight of Portland cement;

Component (e): 2 parts by weight of water containing 30% sodium silicate, 1% triethylamine and 1% sodium docytl sulfosuccinate;

Additive: 0.1 part by weight of vermiculite; 0.5 part by weight of methyl chloride;

Components (a), (b), (c), (d) and methyl chloride are mixed, then Component (e) and vermiculate are added, the mixture being vigorously agitated for about 15 to 30 seconds before it is poured into a mold. It solidifies in a few minutes, then forms a hard, tough, solid plastic product in 3 to 12 hours.

EXAMPLE 12

One part by weight of Component (a) (tolylene diisocyanate) is mixed with 1 part by weight of Component (b) as listed below, and Component (c) (a catalytic amount of methyl ethyl ketone peroxide) and 1 part by weight of Component (b) as listed below are mixed. Then 1 part by weight of Component (e) (water containing 10% potassium silicate, 10% silica sol, 1% triethylamine and 2% detergent) is admixed. The mixture is agitated for 15 to 30 seconds, and expands 3 to 10 times its original volume to produce a tough, rigid, cellular solid product.

| Example | Component (b) | Component (d) |
|---|---|---|
| a | as in Example 1 | Portland cement |
| b | as in Example 2 | burnt lime |
| c | as in Example 3 | rapid-setting cement |
| d | as in Example 4 | plaster of Paris |
| e | as in Example 5 | none |
| f | as in Example 6 | sulphate-resistant cement |
| g | as in Example 7 | none |
| h | as in Example 8 | synthetic anhydrite |
| i | as in Example 9 | gypsum |
| j | as in Example 10 | mortar cement |
| k | as in Example 11 | calcium sulfate cement |
| l | as in Example 2 | pozzolan cement |
| m | as in Example 3 | lime cement |

EXAMPLE 13

About 1 part by weight of Component (a), listed in examples below, 2 parts by weight of Component (b), listed in examples below, 3 parts by weight of Portland cement (Component (d)) and a catalytic amount of Component (c) (methyl ethyl ketone peroxide) are mixed; then 2 parts by weight of water containing 30% sodium silicate, 1% triethylenetetramine (Component (e)) and 0.1 part by weight of a blowing agent (methylene chloride) are added and vigorously agitated for 15 to 30 seconds. The mixture then expands 1 to 10 times its original volume and in a short time, solidifies to form a tough, cellular solid product.

| Example | Component (a) | Component (b) |
|---|---|---|
| a | tolylene-2,4-diisocyanate | as in Example 2 |
| b | tolylene-2,6-diisocyanate | as in Example 1 |
| c | tolylene diisocyanate (80% -2,4- and 20% -2,6-isomer) | as in Example 4 |
| d | sulphonated polyphenyl-polymethylenepolyisocyanate | as in Example 3 |
| e | polyphenyl-polymethylene-polyisocyanate | as in Example 1 |
| f | isocyanate-terminated polyether (NCO content 19% by weight) | as in Example 5 |
| g | isocyanate-terminated polyester (NCO content 11% by weight) | as in Example 4 |
| h | isocyanate-terminated polybutadiene (NCO content 25%) | as in Example 5 |
| i | isocyanate-terminated polysulfide (NCO content 15% by weight) | as in Example 6 |
| j | residue of tolylene diisocyanate distillation (approximately 18% by weight of NCO) | as in Example 9 |
| k | 25% solution of TDI residue in MDI (NCO content 30%) | as in Example 7 |

Example 14

About 2 parts by weight of Component (a) (tolylene diisocyanate), 0.5 part by weight of a polyhydroxyl compound listed (Additive Component), 2 parts by weight of Component (b) (containing 50% diallyl phthalate, 10% diallyl fumarate, 10% diallyl benzene phosphonate, 10% methallyl methacrylate and 20% styrene containing 0.5% diethyl aniline), 0.05 part by weight of Component (c) (acetyl benzoyl peroxide) and 1 part by weight of Portland cement (Component (d)) are mixed, then agitated for about 30 minutes; then a mixture of 2 parts by weight of water, containing 2 parts by weight of Portland cement and 0.001 part by weight of tin acetate, is added and agitated for 15 to 30 seconds. The mixture expands 2 to 5 times its original volume and solidifies in a short period of time, thereby producing a tough, cellular solid product.

Organic polyhydroxyl compounds used in the examples are: polyethylene glycol (average molecular weight 480), polypropylene glycol (average molecular weight 600), dibutylene glycol, epichlorohydrin polymer, saturated polyester resin (4 mols glycerol, 2.5 mols adipic acid and 0.5 mol phthalic anhydride), a polyester amide containing at least 2 hydroxyl groups per molecule (molecular weight 1400 to 1500), a polycarbonate with at least 2 hydroxyl groups per molecule (diethylene glycol and phosgene), an additional product of propylene oxide with phenoformaldehyde resin, polyacetal (diethylene glycol and formaldehyde), glycerol, butylene-1,4-glycol, pentaerythritol, and polyether (tetrahydrofuran polymerized).

EXAMPLE 15

Component (a): 1 part by weight of tolylene diisocyanate, 0.25 part by weight of polypropylene glycol (molecular weight 500);

Component (b): 1 part by weight of unsaturated polyester resin (2 mols adipic acid, 1 mol fumaric acid, 3.25 mols of propylene glycol) containing 25% styrene and a cobalt catalyst;

Component (c): catalytic amount of methyl ethyl ketone

Component (e): 3 parts of water containing 60% sodium silicate, 3% soap and 1% triethylamine;

Hardener: listed below in the amount wherein the mols of the hardener are equal to the mols of the alkali metal atoms;

Blowing agent: 0.5 part by weight of ethylene chloride;

Components (a), (b), (c) and the blowing agent are mixed; then Component (e) and the hardener are added simultaneously while agitating for a few seconds. The mixture expands 3 to 10 times its original volume, thereby producing a rigid, cellular solid product.

Hardeners: Acetic acid, formic acid, propionic acid, propionic acid chloride, methanesulphonic acid chloride, ethanesulphonic acid, 4-toluenesulphonic acid, trimethyl phosphite, triethyl phosphate, dimethyl phosphate, diethyl phosphite, diethylphosphate, phosphoric acid, thiophosphoric acid trimethylester, sodium dihydrogen phosphate, sodium hydrogen sulfate, calcium hydrogen sulfate, propyl chloride, ethyl bromide, isopropyl iodide, benzyl chloride chloroacetic acid, dichloroacetic acid, sulphurous acid, sulphuric acid, hypophosphorus acid, phoshinic acid, phosphonous acid, phosphonic acid, oxalic acid, glycolic acid and p-xylylene dichloride.

Although specific materials and conditions were set forth in the above Examples, these were merely illustrative of preferred embodiments of my invention. Various other compositions, such as the typical materials listed above may be used where suitable. The reactive mixtures and products of my invention may have other agents added thereto in order to enhance or otherwise modify the reaction and products. Other modifications of my invention will occur to those skilled in the art upon reading my disclosure. These are intended to be included within the scope of my invention, as defined in the appended claims.

I claim:

1. The process for the production of polyisocyanate-polyester silicate plastic by mixing the following components:
   (a) 20 to 70 parts by weight of an organic polyisocyanate or polythiocyanate;
   (b) 3 to 80 parts by weight of an unsaturated polyester resin;
   (c) catalytic amount of a free-radical initiator to polymerize the unsaturated polyester resin;
   (d) 0% to 100% by weight of an inorganic water-binding component, said water-binding component being capable of absorbing water to form a solid or a gel, and based on the total weight of components (a) and (b);
   (e) 10% to 100% by weight of a polyisocyanate curing agent, based on the total weight of components (a), (b) and (d), but with the proviso that the polyisocyanate curing agent is added last.

2. The process of claim 1 wherein the organic polyisocyanate is selected from the group consisting of tolylene-2,4 and -2,6-diisocyanate, polyphenyl-polymethylene-isocyanates and mixtures thereof.

3. The process of claim 1 wherein the water-binding agent is selected from the group consisting of a hydraulic cement, synthetic anhydrite, gypsum or burnt lime.

4. The process of claim 1 wherein the initiator is selected from the group consisting of an organic peroxide, an inorganic peroxide, alkali metal persulfate, ammonium persulfate, a redox system and a peroxide with a metal catalyst.

5. The process of claim 1 wherein the curing agent is selected from the group consisting of water, when an oxidated silicon compound has been added to other components; water containing 10% to 70% by weight of an alkali metal silicate, selected from the group consisting of sodium silicate and potassium silicate; water containing 10% to 70% by weight of silica sol and mixtures thereof.

6. The process of claim 1 wherein from 0% to 50% by weight, based on the reaction mixture, of a chemically inert blowing agent, boiling within the range of from −25° C. to 80° C. is added simultaneously with component (e) and the reaction mixture is allowed to react to completion while foaming.

7. The process of claim 1 wherein the mixture contains 0.001% to 10% by weight, based on the reaction mixture of an activator selected from the group consisting of tertiary amines, organo-metallic compounds and silaamines, and is added with component (e) of claim 1.

8. The process of claim 1 wherein the mixture contains from 0% to 20% by weight of surface-active additives and is added with Component (e).

9. The process of claim 1, wherein the reaction is accompanied by foaming produced by the reaction of water in the curing agent with the polyisocyanate to produce carbon dioxide which acts as the blowing agent.

10. The process of claim 1, wherein inorganic or organic particulate or pulverulent filler materials are added to the reaction mixture before, or with, Component (e).

11. The product of the process of claim 1.

12. The process of claim 1 where, in addition to the polyisocyanate, hardeners are used for the alkali metal silcate, which is water-soluble or is dispersed in water, and are added simultaneously with component (e).

13. The process of claim 1 wherein an oxidated silicon compound, selected from the group consisting of silica, alkali metal silicates, alkaline earth metal silicates, natural silicates containing free silicic acid groups and mixtures thereof, is added in the ratio of oxidated silicon compound to polyisocyanate and unsaturated polyester of 70:30 to 20:80 parts by weight to component (a) of claim 1.

14. The process of claim 1, wherein an organic hydroxyl compound is added with the organic polyisocyanate compound in the ratio of 50 to 99 mols of organic polyisocyanate compound to 1 to 50 mols of organic hydroxyl compound.

15. The process of claim 1 wherein the polyisocyanate, unsaturated polyester, water-binding component, initiator, activator and curing agent of claim 1 are simultaneously mixed; then at a predetermined temperature ranging from 0° C. to 150° C., the blowing agent is added to the mixture, thereby producing a polyurethane silicate cellular solid.

16. The process of claim 12 wherein the hardener is selected from the group consisting of mineral acids, hydrogen-containing salts of mineral acids, organic acids, polyfunctional alkylating agents and monofunctional alkylating agents.

* * * * *